Figures 1, 2:
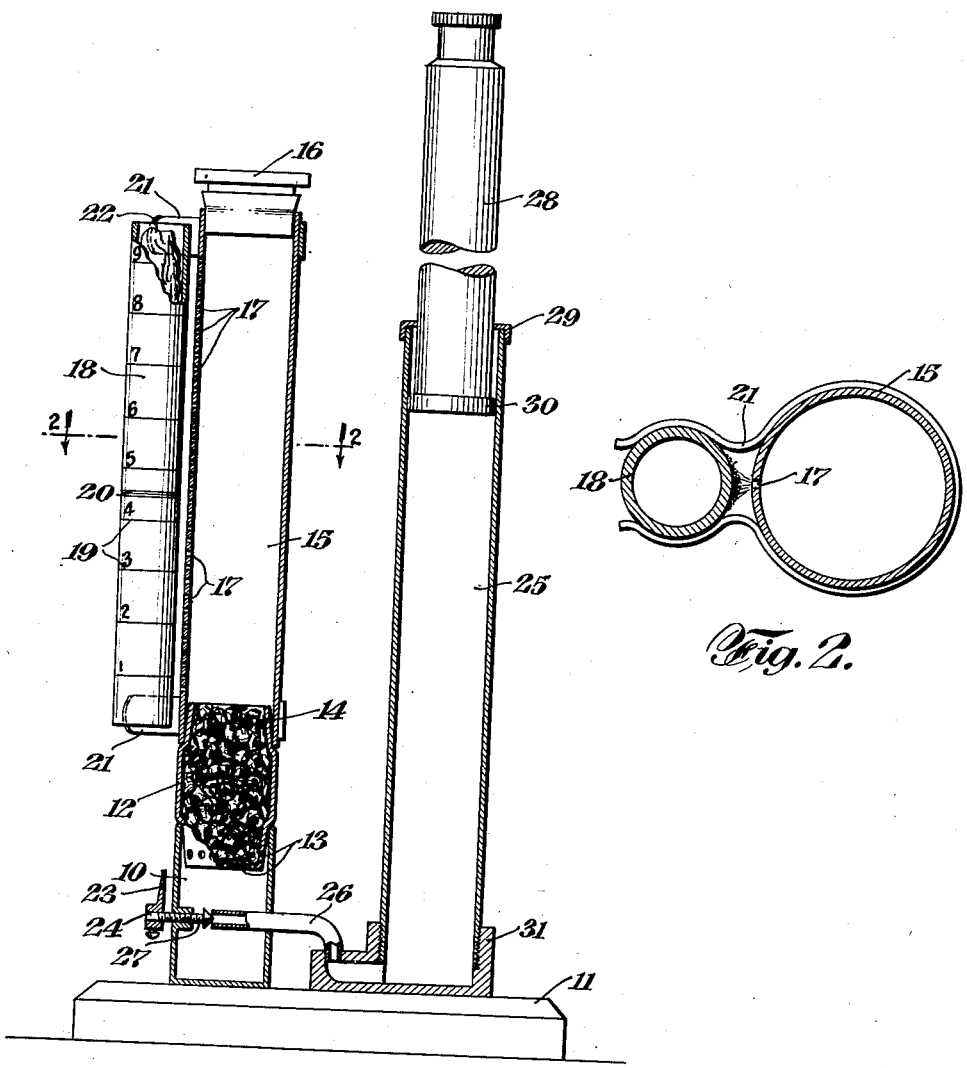

April 2, 1940.  W. M. SCHWEICKART  2,195,842
DUST INDICATOR
Filed Feb. 23, 1938

INVENTOR
William M. Schweickart
BY
Edwards Bower Pool
ATTORNEYS

Patented Apr. 2, 1940

2,195,842

UNITED STATES PATENT OFFICE 2,195,842

DUST INDICATOR

William M. Schweickart, Euclid, Ohio, assignor, by mesne assignments, to Pocahontas Fuel Company, Incorporated, New York, N. Y., a corporation of Virginia Application February 23, 1938, Serial No. 191,947

5 Claims. (Cl. 73—51)

This invention relates to indicating apparatus and is particularly directed to a system for indicating dust present in a mass of fragmentary material.

The object of the invention is to provide a system employing apparatus of simple, compact and readily operated type suitable for frequent use. A more specific purpose is to provide a system of this type adapted for the empirical determination of dust in bituminous coal.

Other objects, including the specific construction and arrangement of the parts, will appear from the following description considered in connection with the accompanying drawing, in which:

Fig. 1 is a side elevation of one form of the invention showing the air supply cylinder, dust cylinder and capsule member in section, parts being broken away; and Fig. 2 is an enlarged horizontal cross section on line 2—2 of Fig. 1.

In the illustrated embodiment a cylindrical air chamber 10 mounted on base 11 is provided with an open top into which the cylindrical capsule 12 is snugly fitted. The capsule is provided with openings 13 communicating with chamber 10, and an air outlet at the top, preferably being provided with an open top and a portion 14 of reduced diameter over which the dust column cylinder 15 is fitted. Cylinder 15 is closed at the top by removable cap 16, and is provided with outlet means for discharging dust at various elevations, the form illustrated being provided with a vertically aligned series of small openings 17.

Aligned with openings 17 is a suitable scale which is shown in the form of an indicator tube 18 provided with suitable indicia 19; and a danger line 20 may be located to indicate the point of division between permissible and excessive quantities of dust.

Tube 18 is held in place by clips 21 mounted on cylinder 15, and may be open for reception of an oiled cloth 22 or other suitable material for applying a dust adhesive coating to the indicator tube 18.

Air under pressure is introduced into chamber 10 from an air supply cylinder 25 mounted on base 11 communicating through pipe 26 with chamber 10, preferably through valve 27, which may be provided with suitable means such as pointer 23 on valve stem 24 to indicate the valve setting. The pump plunger 28 is weighted to provide the necessary air pressure when the plunger is raised and then released, as by forming the plunger of solid metal, and is of appropriate size to travel between an upper stop, which may consist of the cylinder cap 29 engaging the piston head 30, and a lower stop which may be the base 31 of the cylinder 25.

In operation tube 18 is provided with a coating to which the dust will adhere, which is conveniently accomplished by wiping the surface of the tube adjacent aperture 17 with oil, which may be applied by means of cloth 22, tube 18 being removable from clips 21 for the purpose. Capsule 12 is filled with the material to be tested, such as a sample of bituminous coal, seated in the top of chamber 10 and column 15 is then seated on the top of capsule 12. Plunger 28 is raised to its upper stop and released, the descent of the plunger providing a measured quantity of air under fixed uniform pressure passing upwardly through capsule 12 and projecting dust upwardly into column 15, from which the dust escapes through apertures 17 and impinges on the scale 18, where it is retained by the film of oil or the like. The dust on said scale will indicate the height to which dust was propelled in column 15, providing a numerical measure of the dust permitting ready comparison of dust content with other samples of coal. After use the index 18 may be readily wiped clean with cloth 22, replacing the oil film and preparing the apparatus for immediate reuse.

The air supply to the coal in capsule 12 may readily be regulated by valve 27 to adapt the arrangement to different types of material or conditions. The use of a weighted plunger supplies a fixed quantity of air at a fixed uniform rate, providing a convenient method for assuring uniformity of expulsion of dust from the material in capsule 12.

While the preferred embodiment has been described and illustrated the invention is capable of substantial variation within the scope of the invention as indicated by the claims. Moreover, while it is primarily adapted for determining the quantity of dust in the finer grades of bituminous coal, it may be adapted for other purposes, which for instance may utilize the classification of the dust in the column of air in cylinder 15.

I claim:

1. Dust-indicating apparatus comprising a receptacle for fragmentary dust-containing material arranged for the passage of an air current through the material, an air passage positioned to receive the air current from the receptacle and provided with outlet means for discharging air from said current at longitudinally spaced points, means registering with said discharge for receiving and retaining dust discharged at different longitudinal points, and means for passing an air current through the receptacle, passage and outlet means.

2. Dust-indicating apparatus comprising a receptacle for fragmentary dust-containing material arranged for the passage of an air current through the material, a vertical air passage positioned to receive the air current from the receptacle and provided with outlet means for discharging air from said current at different levels, means registering with the outlet means for receiving and separately retaining dust discharged at different levels, and means for passing an air current through the receptacle, passage and outlet means.

3. Dust-indicating apparatus comprising a receptacle for fragmentary dust-containing material having an air inlet at the lower part thereof, an air outlet at the top thereof, a vertical passage extending upwardly from and communicating with the outlet, vertically spaced openings in the side of the passage, means registering with said openings for collecting dust discharged therethrough, and means for passing a current of air through the receptacle, passage and openings.

4. Dust-indicating apparatus comprising a receptacle for dust-containing material provided with an air inlet in the lower part and an air outlet in the upper part thereof, an air supply chamber surrounding the inlet, an air discharge chamber extending upwardly from the outlet, vertically aligned outlet means in the side of the passage for discharging the air laterally, and dust-collecting means registering with the outlet means and arranged to collect and retain separately the dust discharged by said means at vertically spaced levels.

5. Dust measuring apparatus comprising means for creating an upward current of air carrying suspended dust particles, a vertically extending tube surrounding said dust laden air currents and having a plurality of side outlets extending longitudinally of the tube to permit lateral leakage of said dust laden air at successive vertical points, and stationary indicating means along said outlet means for retaining dust particles at successive vertical points along said tube so as to indicate the dust content of said air currents.

WILLIAM M. SCHWEICKART.